United States Patent
Rebot

(10) Patent No.: US 10,298,727 B2
(45) Date of Patent: May 21, 2019

(54) CLIP FOR MOUNTING EXTERNAL DEVICE TO ELECTRONIC DEVICE

(71) Applicant: SPIN MASTER LTD., Toronto (CA)

(72) Inventor: Natalie R. Rebot, Toronto (CA)

( * ) Notice: Subject to any disclaimer, the term of this patent is extended or adjusted under 35 U.S.C. 154(b) by 0 days.

(21) Appl. No.: 15/886,679

(22) Filed: Feb. 1, 2018

(65) Prior Publication Data
US 2018/0159967 A1    Jun. 7, 2018

Related U.S. Application Data

(63) Continuation-in-part of application No. 15/712,259, filed on Sep. 22, 2017, now Pat. No. 9,921,461, and
(Continued)

(51) Int. Cl.
*B60R 11/00* (2006.01)
*G03B 21/14* (2006.01)
(Continued)

(52) U.S. Cl.
CPC ......... *H04M 1/026* (2013.01); *B60R 11/0235* (2013.01); *B60R 11/0252* (2013.01);
(Continued)

(58) Field of Classification Search
CPC ...... G03B 21/14; G03B 21/145; G03B 21/02; G03B 21/001; G02B 7/003; B60R 11/0252; B60R 11/0235; F16B 2/10
See application file for complete search history.

(56) References Cited

U.S. PATENT DOCUMENTS

| 2,445,651 | A | * | 7/1948 | Weavie | G03B 21/32 |
| | | | | | 352/102 |
| 2,478,336 | A | * | 8/1949 | Stein | G03B 21/26 |
| | | | | | 353/43 |

(Continued)

FOREIGN PATENT DOCUMENTS

| CN | 104950558 A | 9/2015 |
| CN | 205958898 U | 2/2017 |

(Continued)

OTHER PUBLICATIONS

PCT/CA2017/000152, International Search Report, dated Sep. 28, 2017, Canadian Intellectual Property Office.
(Continued)

*Primary Examiner* — William C Dowling
(74) *Attorney, Agent, or Firm* — Millman IP Inc.

(57) ABSTRACT

In an aspect, a device-and-clip system is provided for an electronic device. The system includes an external device that cooperates with at least one electronic device feature on the rear face to perform a selected function. The system includes a clip including a first clip arm having an arm marker thereon and which is engageable with the front face of the electronic device and a second clip arm that is engageable with the rear face of the electronic device. The system further includes an application that is executable to instruct the electronic device to display a screen marker on the display screen in a selected position and in a selected orientation such that positioning and orienting of the first clip arm on the display screen of the smart phone with the arm marker aligned with the position and orientation of the screen marker positions the external device in alignment with the at least one electronic device feature.

14 Claims, 10 Drawing Sheets

Related U.S. Application Data a continuation-in-part of application No. PCT/CA2017/000152, filed on Jun. 16, 2017, which is a continuation-in-part of application No. 15/217,067, filed on Jul. 22, 2016.

(60) Provisional application No. 62/351,506, filed on Jun. 17, 2016.

(51) Int. Cl.
| | |
|---|---|
| *F16B 2/10* | (2006.01) |
| *H04M 1/02* | (2006.01) |
| *H04B 1/3877* | (2015.01) |
| *G06F 1/16* | (2006.01) |
| *B60R 11/02* | (2006.01) |
| *G02B 7/00* | (2006.01) |

(52) U.S. Cl.
CPC .............. *F16B 2/10* (2013.01); *G02B 7/003* (2013.01); *G03B 21/145* (2013.01); *G06F 1/1605* (2013.01); *G06F 1/1607* (2013.01); *G06F 1/1626* (2013.01); *G06F 1/1628* (2013.01); *H04B 1/3877* (2013.01); *H04M 1/0254* (2013.01); *H04M 1/0279* (2013.01); *H04M 1/0264* (2013.01); *H04M 1/0272* (2013.01)

(56) References Cited

U.S. PATENT DOCUMENTS

| | | | | |
|---|---|---|---|---|
| 3,741,637 | A | | 6/1973 | Katsuragi |
| 5,321,449 | A | * | 6/1994 | Coccoli ............... G03B 21/001 353/43 |
| 7,874,683 | B2 | * | 1/2011 | Noba ...................... H04N 5/74 353/119 |
| 8,714,799 | B2 | | 5/2014 | Chien |
| 8,744,521 | B2 | * | 6/2014 | Kim .................... H04M 1/0202 345/1.1 |
| 2001/0050755 | A1 | | 12/2001 | Bogomolnyi |
| 2003/0024975 | A1 | * | 2/2003 | Rajasekharan ... G06F 17/30879 235/375 |
| 2005/0072691 | A1 | * | 4/2005 | Schlansky ............... B60R 11/00 206/232 |
| 2007/0171383 | A1 | | 7/2007 | Deves |
| 2009/0108057 | A1 | * | 4/2009 | Mu .................. H04M 1/72561 235/375 |
| 2009/0237812 | A1 | * | 9/2009 | Tseng ................ G02B 13/0055 359/808 |
| 2011/0320208 | A1 | * | 12/2011 | Wong .................... B42D 3/123 704/270 |
| 2012/0017236 | A1 | * | 1/2012 | Stafford .................. A63F 13/00 725/32 |
| 2012/0245422 | A1 | * | 9/2012 | Hasbun .............. A61B 1/00108 600/200 |
| 2013/0267283 | A1 | * | 10/2013 | Guzman ................ H04M 1/026 455/575.1 |
| 2013/0276012 | A1 | * | 10/2013 | Ingram ................ H04N 21/442 725/18 |
| 2013/0331148 | A1 | * | 12/2013 | Brough ................. G06F 1/1632 455/557 |
| 2014/0281855 | A1 | * | 9/2014 | Bhatnagar ......... G06F 17/30879 715/205 |
| 2015/0077518 | A1 | * | 3/2015 | Heine .................... G01B 11/25 348/46 |
| 2015/0172431 | A1 | * | 6/2015 | Huang ................. H04B 1/3888 455/556.1 |
| 2015/0323160 | A1 | * | 11/2015 | Duguid ................. G06F 1/1639 362/319 |
| 2016/0360871 | A1 | * | 12/2016 | Schessel ................... A45F 5/00 |
| 2017/0064168 | A1 | * | 3/2017 | Roman ................ H04N 5/2251 |
| 2017/0119250 | A1 | * | 5/2017 | Kolachalama ....... A61B 3/1208 |
| 2017/0237843 | A1 | * | 8/2017 | Ackeret ................. H04M 1/04 455/575.9 |
| 2017/0345536 | A1 | * | 11/2017 | Breiwa ................... H01F 38/14 |

FOREIGN PATENT DOCUMENTS

| | | |
|---|---|---|
| EP | 0246799 B1 | 5/1991 |
| JP | 58-074233 S | 5/1983 |
| JP | 2004326064 A | 11/2004 |
| KR | 10-2010-0138863 A | 12/2010 |
| KR | 10-2015-0015664 | 2/2015 |
| WO | 2007011123 A1 | 1/2007 |
| WO | 2014/091042 A1 | 6/2014 |
| WO | 2015/092785 A1 | 6/2015 |
| WO | 2017/132678 A1 | 8/2017 |

OTHER PUBLICATIONS

KR 10-2018-7003909, Office Action dated Jun. 20, 2018, Korean Intellectual Property Office.
EP17812342, Supplemental Patrial European Search Report, European Patent Office, dated Jun. 18, 2018.
JP2018-503623, Office Action & English translation, Japanese Patent Office, dated Jul. 10, 2018.
U.S. Appl. No. 15/217,067, Non-Final Office Action, US Patent and Tademark Office, dated Sep. 25, 2018.
CA 3005079, Canadian Examination Report, dated Dec. 13, 2018, Canadian Intellectual Property Office.
EP 18183375.7, Partial European Search Report, European Paten Office, dated Feb. 13, 2019.

* cited by examiner

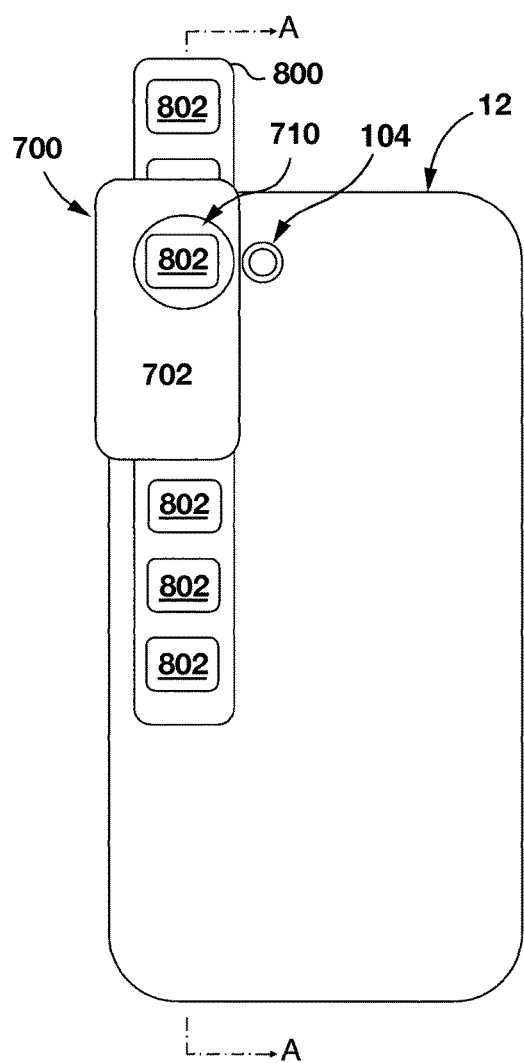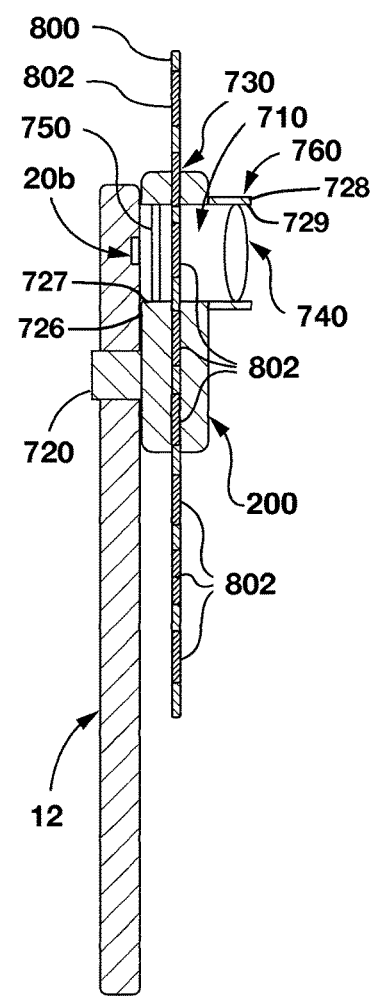
FIG. 12A  FIG. 12B

CLIP FOR MOUNTING EXTERNAL DEVICE TO ELECTRONIC DEVICE

CROSS-REFERENCE TO RELATED APPLICATIONS

This application is a continuation-in-part of U.S. patent application Ser. No. 15/712,259, filed Sep. 22, 2017 and is a continuation-in-part of PCT application PCT/CA2017/000152, filed Jun. 16, 2017, which is a continuation-in-part of U.S. patent application Ser. No. 15/217,067, filed Jul. 22, 2016, and which claims priority to U.S. Provisional Application No. 62/351,506 filed Jun. 17, 2016, the contents of all of which are incorporated by reference herein.

FIELD

The specification relates generally to clips for mounting external devices, such as projectors, to electronic devices, such as smartphones and tablets, and more particularly to a clip that can mount an external device to different models of electronic device, such as a clip that can mount a projector to an Apple iPhone 6, an Apple iPhone SE, an Apple iPad Pro 12.9", a Samsung Galaxy S8, and a Samsung Galaxy Tab S3.

BACKGROUND OF THE DISCLOSURE

It is known to provide mounting systems for mounting devices to smartphones such as camera lens systems which cooperate with the smartphone camera to provide enhanced capability such as the ability to zoom in by more than is possible on the smartphone itself. However, it can be difficult to ensure that the device, when mounted, is in suitable alignment with the feature of the smartphone that it is intended to cooperate with.

SUMMARY OF THE DISCLOSURE

In an aspect, a device-and-clip system is provided for an electronic device such as a smartphone or a tablet having a front face with a display screen thereon, a rear face opposite to the front face, and an edge between the front and rear faces. The device-and-clip system includes an external device that is separate from the electronic device and which has an external device feature. The external device is cooperable with the electronic device when the external device feature is aligned with an electronic device feature on the rear face to perform a selected function. The device-and-clip system includes a clip including a first clip arm having an arm marker thereon and which is engageable with the front face, and a second clip arm that is engageable with the rear face. The first and second clip arms are connected to one another and are movable between an open position to permit removal of the clip from the electronic device and a closed position in which the first and second clip arms clamp the electronic device. The external device is mounted to the clip. The clip has a clip limit surface that is engageable with the edge of the electronic device to determine a reach of the external device feature on the rear face of the electronic device. The clip limit surface is positioned such that, for a first type of electronic device in which the electronic device feature is positioned at a first distance from the edge, the clip is mountable to the first type of electronic device with the external device feature aligned with the electronic device feature on the rear face such that the clip limit surface is spaced from the edge. For a second type of electronic device in which the electronic device feature is positioned at a second distance from the edge that is different than the first distance, the clip is mountable to the second type of electronic device with the external device feature aligned with the electronic device feature on the rear face of the second type of electronic device.

In another aspect, a device-and-clip assembly is provided for an electronic device such as a smartphone or a tablet having a front face with a display screen thereon, and a rear face opposite to the front face. The device-and-clip assembly includes an external device that is separate from the electronic device but which cooperates with at least one electronic device feature on the rear face to perform a selected function, and a clip. The clip includes a first clip arm having an arm marker thereon and which is engageable with the front face, and a second clip arm that is engageable with the rear face. The first and second clip arms are connected to one another and are movable between an open position to permit removal of the clip from the electronic device and a closed position in which the first and second clip arms clamp the electronic device, wherein the external device is mounted to the clip. The device-and-clip assembly further include an application that is executable by the electronic device so as to instruct the electronic device to display a screen marker on the display screen in a selected position such that positioning of the first clip arm on the display screen with the arm marker aligned with the position of the screen marker positions the external device in alignment with the at least one electronic device feature.

In yet another aspect, a device-and-clip system is provided for an electronic device such as a smartphone or a tablet having a front face with a display screen thereon, and a rear face opposite to the front face. The device-and-clip system includes a projector that is separate from the electronic device. The projector has an aperture therethrough, an inside face defining a light inlet to the aperture, and an outside face defining a light outlet from the aperture. The projector further includes a slot positioned to hold a slide transparency in the aperture for transmission of light therethrough. The projector further includes a magnifying lens aligned with the aperture and positioned to enlarge an image on the slide transparency for projection through the light outlet. The device-and-clip system further includes a clip including a first clip arm that is engageable with the front face, and a second clip arm that is engageable with the rear face, wherein the first and second clip arms are connected to one another and are movable between an open position to permit removal of the clip from the electronic device and a closed position in which the first and second clip arms clamp the electronic device. In the closed position, the projector is holdable by the clip such that the light inlet faces the light-emitting element so as to receive light therefrom into the light passage, so as to transmit said light through the slide transparency, and project an image on the slide transparency out through the light outlet onto a suitable receiving surface.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 12A is a rear view of an image projection device attached to a variant of the mobile device of FIG. 1; and FIG. 12B is a cross-sectional view of the image projection device of FIG. 12A along line A-A.

DETAILED DESCRIPTION

Figure 1:
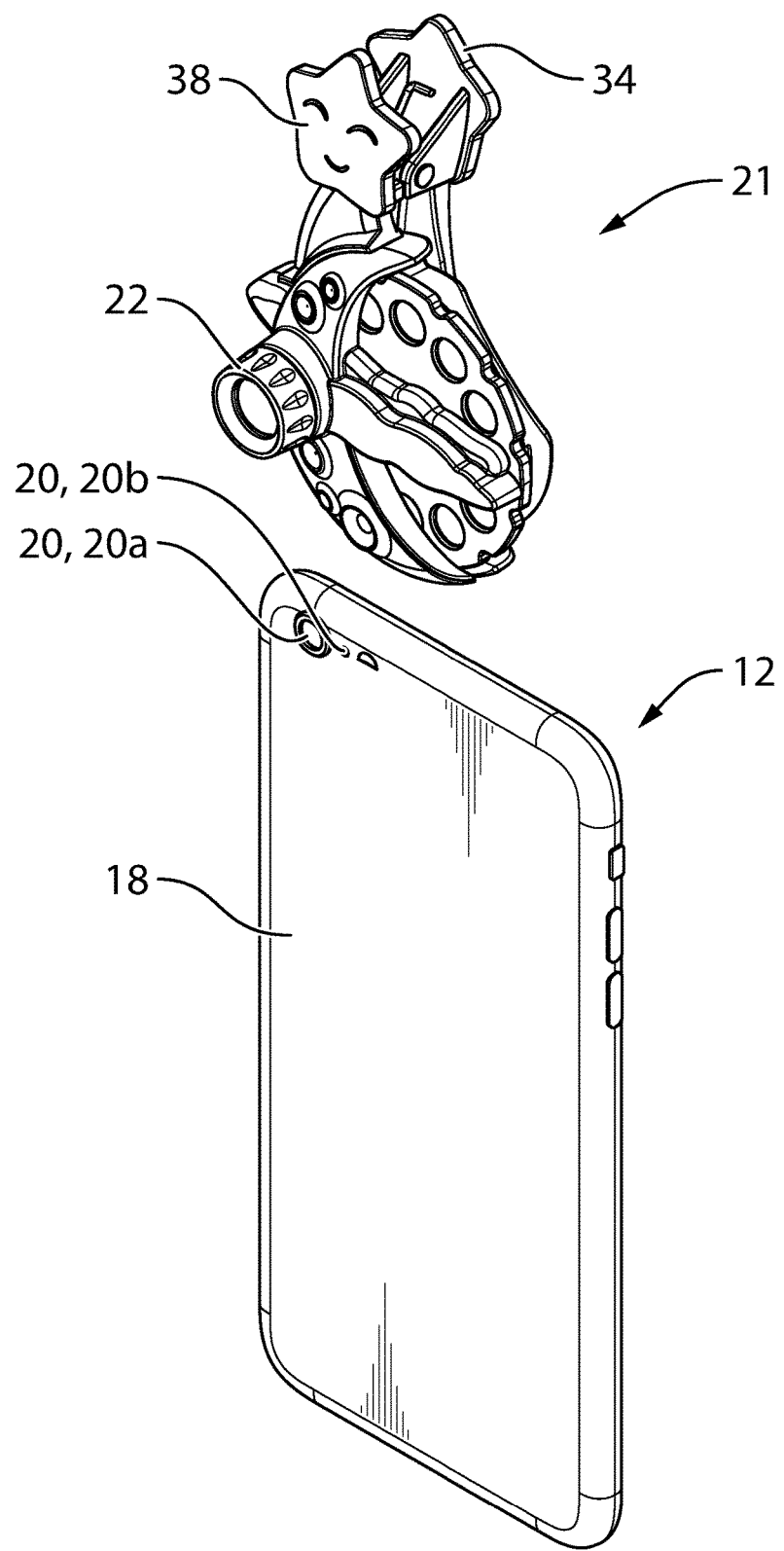
FIG. 1 is a perspective view of a device-and-clip assembly that is mountable to an electronic device such as a smartphone according to a non-limiting embodiment.
Figure 2:
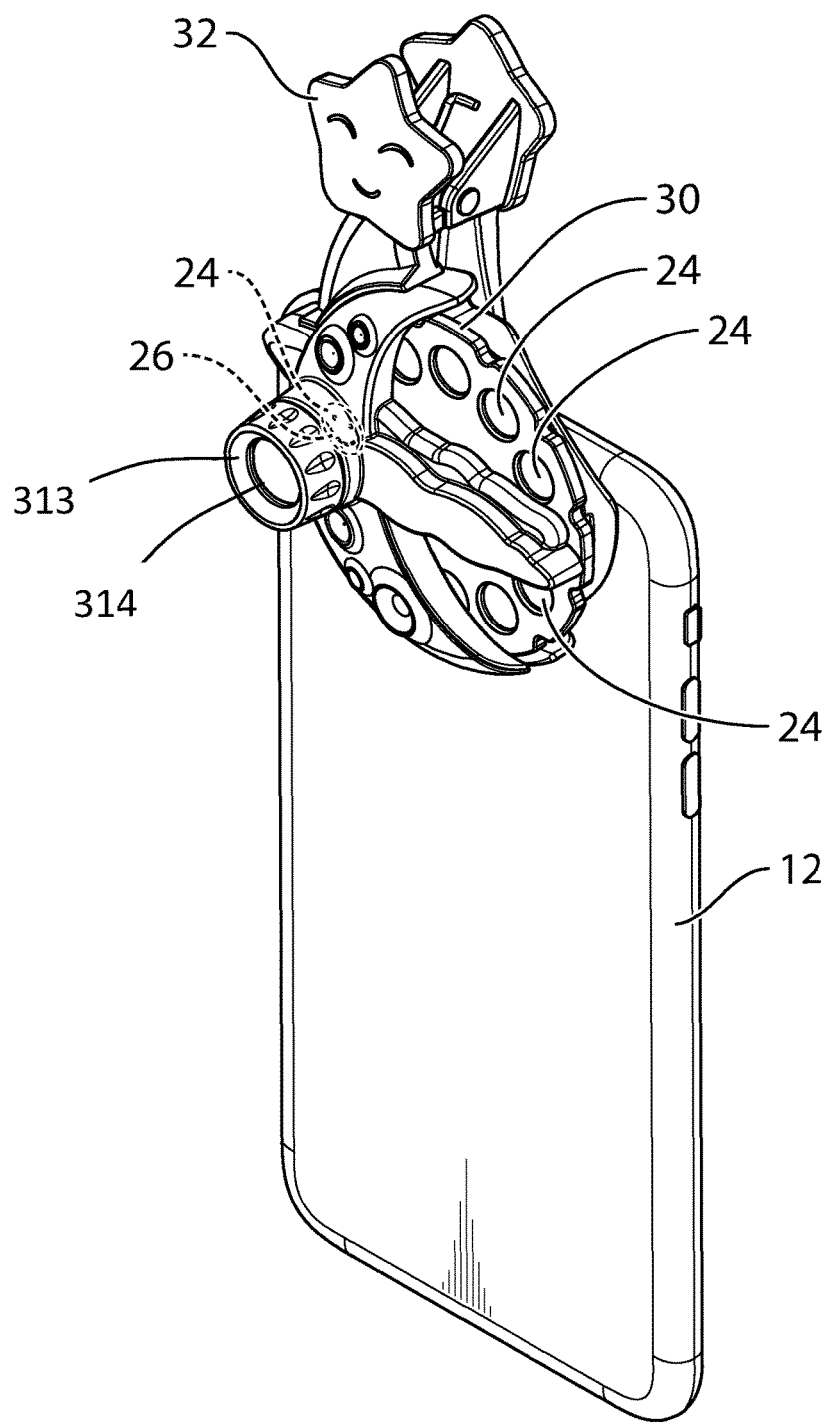
FIGS. 2 and 3 are perspective views of the device-and-clip assembly shown in FIG. 1 mounted to the electronic device.
Figure 3:
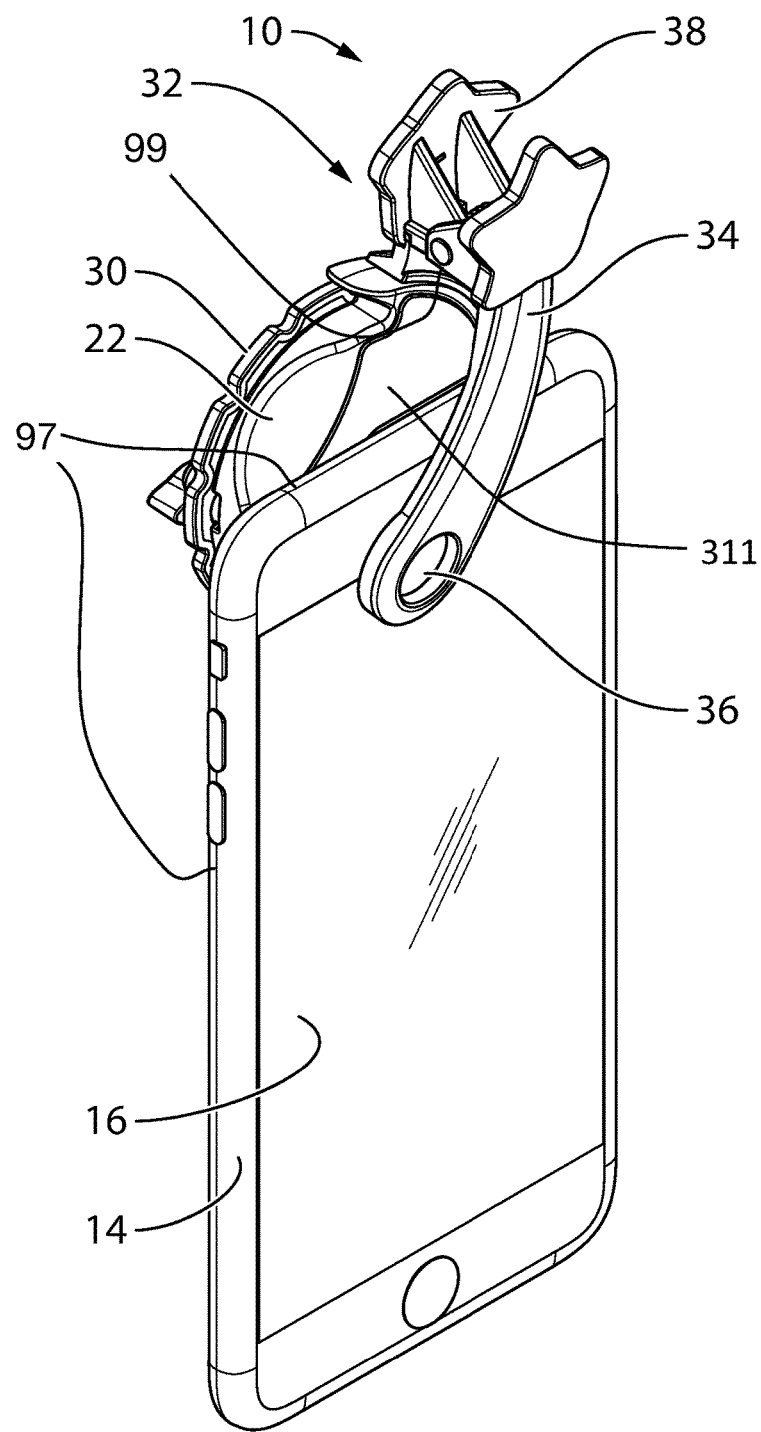

Reference is made to FIGS. 1, 2 and 3, which show a device-and-clip system for an electronic device 12 such as a smartphone or a tablet. The device-and-clip system is configured to permit a user to properly position and use an external device with the electronic device 12. The electronic device may also be referred to as a mobile device 12.

The electronic device 12 has a front face 14 (FIG. 3) with a display screen 16 thereon, and a rear face 18 (FIGS. 1 and 2) opposite to the front face 14. The rear face 18 has at least one electronic device feature 20 thereon. In the present example, the rear face 18 has a plurality of features 20, including a camera 20a, and a light-emitting element 20b, which may be, for example, an LED. In some embodiments, the light-emitting element 20b may serve as a camera flash and as a flashlight on the electronic device 20. For greater certainty, the term 'camera flash' is used in various places in the present disclosure, however it is merely a way of identifying the light-emitting element 20b in a readable way. It will be understood by one skilled in the art, however, that the 'camera flash' is intended to mean a light-emitting element that is provided on the electronic device 20. The camera 20a has a camera aperture 104 (FIG. 11) and typically includes optics (i.e. lenses and/or mirrors) and a CMOS-based image sensor to capture digital images. The camera 20a can be controlled through a combination of software and hardware operating on the mobile device 12.

The device-and-clip system includes a device-and-clip assembly 21 (FIG. 1) that is mountable to the electronic device 12 and an application 42 (shown schematically at 42 in FIG. 5) that is executable on the electronic device 12.

The device-and-clip assembly 21 includes an external device 22 that is separate from the electronic device but which cooperates with at least one electronic device feature 20 (FIG. 1) on the rear face 18 to perform a selected function. The at least one electronic device feature 20 may be selected from the group of features consisting of the camera 20a, the light-emitting element 20b, a laser, a fingerprint sensor, or any other suitable feature. In the present example, the external device 22 is a projector that is positioned to receive light from the light-emitting element 20b, to pass the light through a transparent slide 24 (FIG. 2) containing an image 26, and to project the image 26 onto a suitable receiving surface 28 (FIG. 4), such as a wall, a ceiling, a floor or any other suitable receiving surface. Thus, the aforementioned selected function is to project the image 26 onto the receiving surface 28. In the example shown, the slide 24 is one of a plurality of slides 24 that are held on a slide disk 30. The slide disk 30 is rotatable in the projector so that each slide may in turn be positioned to receive light from the light-emitting element 20b. For the purposes of the present disclosure, the term 'projector' may be used interchangeably with the term 'image projection device'.

It will be understood that the projector is but an example of the external device. The external device 22 could alternatively be some other type of a device, such as, for example, a special lens holder that cooperates with the camera 20a to permit very high magnification photographs to be taken. The external device 22 could itself incorporate electronics and could, therefore, be an electronic device. However, for the purposes of identification it is referred to consistently in the present disclosure as the external device 22, and the device to which it is mounted via the clip 32 is referred to as the electronic device 12.

Figure 8:
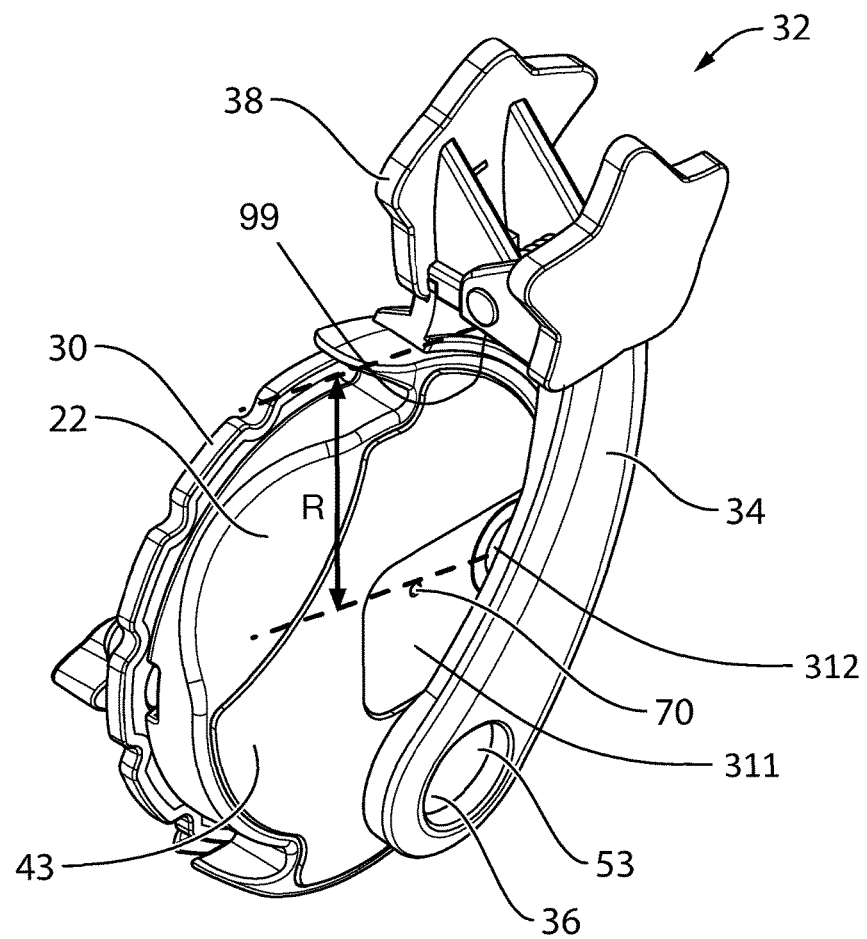
FIG. 8 is a perspective view of the device-and-clip assembly.
Figure 9:
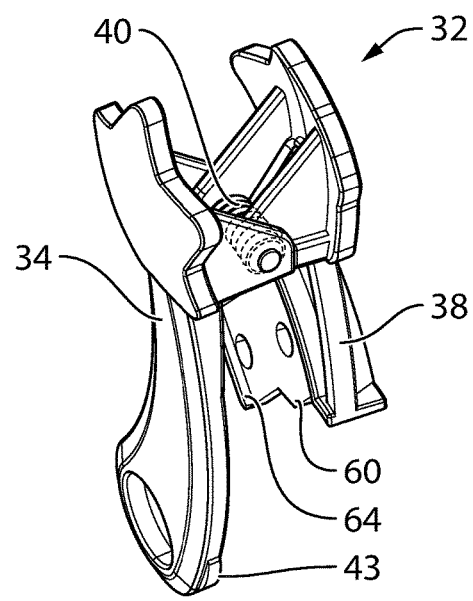
FIG. 9 is a perspective exploded view of device-and-clip assembly.
Figure 9:
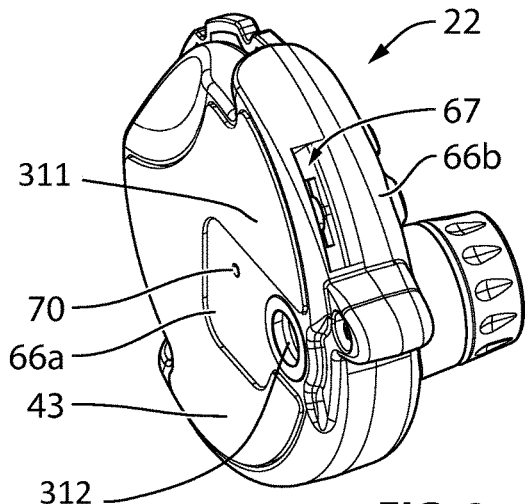

Referring to FIGS. 8 and 9, the device-and-clip assembly 21 further includes a clip 32 including a first clip arm 34 having an arm marker 36 thereon, and which is engageable with the front face 14 of the electronic device 12 as explained in further detail below. The clip 32 further includes a second clip arm 38 that is engageable with the rear face 18 of the electronic device 12. The first and second clip arms 34 and 38 are connected to one another and are movable between an open position to permit removal of the clip 32 from the electronic device 12 and a closed position in which the first and second clip arms 34 and 38 clamp the electronic device 12. The first and second clip arms 34 and 38 are biased towards the closed position by any suitable means, such as by a clip biasing member 40. In the present example, the clip biasing member 40 is a helical torsion spring, however, any other suitable type of structure may be used as the clip biasing member 40.

Optionally, one or both of the first and second clip arms 34 and 38 may be provided with a gripping layer 43 such as a nano-suction material, a rubber layer, or any other suitable layer to assist in retaining the device-and-clip assembly 21 in place once it is mounted to the electronic device 12. In the present example, both the first and second clip arms 34 and 38 include a gripping layer 43 thereon.

The external device 22 may be mounted to the clip 32 in any suitable way. An example structure that is used to mount the external device 22 to the clip 32 is described further below.

Figure 5:
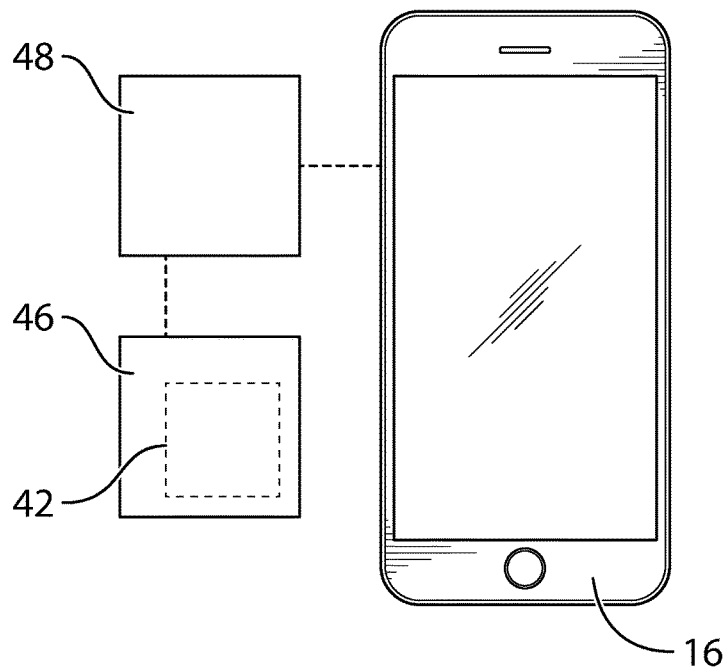
FIG. 5 is a schematic view of an application that is executable by the electronic device that cooperates with a structure on the device-and-clip assembly to assist in positioning and aligning the device-and-clip assembly on the electronic device.
Figure 6A:
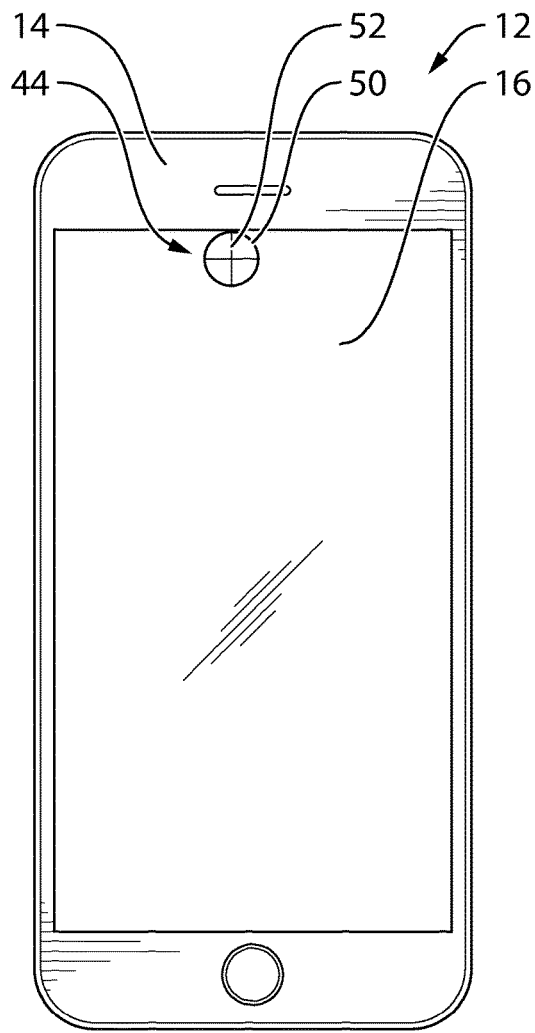
FIG. 6A is a plan view of the electronic device during execution of the application.

FIG. 5 is a schematic layout of some of the hardware that makes up the electronic device 12. Referring to FIGS. 5 and 6A, the application 42 (FIG. 5) is executable by the electronic device 12 so as to instruct the electronic device 12 to display a screen marker 44 (FIG. 6A) on the display screen 16 in a selected position and a selected orientation such that positioning and orienting of the first clip arm 34 on the display screen 16 with the arm marker 36 aligned with the position and orientation of the screen marker 44 positions the external device 22 in alignment with the at least one electronic device feature (in this case 20b).

The screen marker 44 therefore has a shape that has a distinguishable orientation. In the example shown, the screen marker 44 is a circle 50 (albeit with a clipped section at the top) that is positioned at the upper edge of the display screen 16, and which has a cross hair 52 inside it. In the example shown, the circle 50 is displayed in a first colour (e.g. white), and the cross hair 52 is displayed in a second colour that is different than the first colour (e.g. black). Alternatively, any other suitable shape may be used for the screen marker 44 instead of the aforementioned circle 50 and cross hair 52.

With reference to FIG. 5, the application 42 may be stored in a memory 46 in the electronic device 12 and is executed by a processor 48 in the electronic device 12.

Figure 6B:
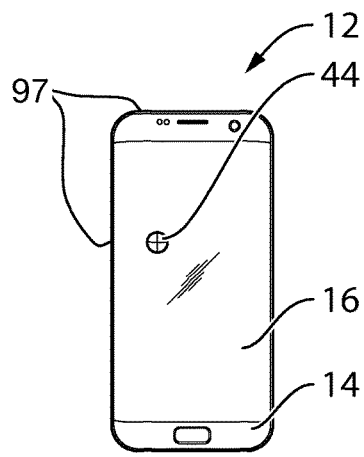
FIGS. 6B and 6C are plan views of other examples of the electronic device during execution of the application.
Figure 6C:
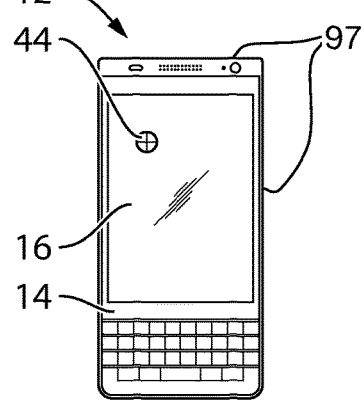

It will be noted that different smartphones have their features 20 in different locations. For example, the light-emitting element 20b on an iPhone™ SE is about 0.25 inches down and about 0.69 inches over laterally from the upper right corner of the electronic device. However, on an iPhone™ 6 Plus, the light-emitting element 20b is about 0.25 inches down and about 1 inch over laterally from the upper right corner of the electronic device. The application 42 may be configured to determine the particular model of smartphone 12 that it is running on. It may then be configured to display the screen marker 44 in the appropriate place based on the determined model of smartphone 12. Examples of other screen markers 44 shown in other positions on other types (i.e. other make and/or model) of an electronic device 12 are shown in FIGS. 6B and 6C. In these other examples of an electronic device 12 it will be noted that the circle 50 is not clipped since it is not at an edge of the display screen 16. For greater clarity, the electronic device 12 shown in FIG. 6A may be representative of an iPhone™ 6 Plus made by Apple Inc., while the electronic device 12 shown in FIG. 6B may be representative of a Samsung Galaxy™ S7 Edge, made by Samsung Electronics Co., Ltd., while the electronic device 12 shown in FIG. 6C may be representative of a Blackberry Keyone™, made by Blackberry Limited.

Figure 7:
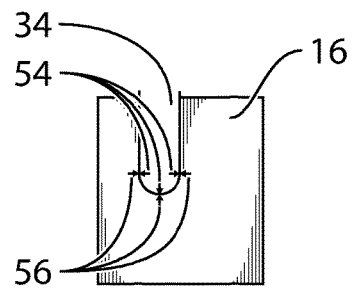
FIG. 7 is a plan view of an alternative structure on the device-and-clip assembly and an alternative application that cooperate to assist in positioning and aligning the device-and-clip assembly on the electronic device.

As can be seen in FIG. 7, and as implicitly expressed by the positions of the screen markers 44 in FIGS. 6A through 6C, the clip 32 is sized to be able to fit different types of electronic device 12, which have different distances of the light-emitting element 20b from their edges. The distance of the light emitting element 20b on the iPhone™ 6 Plus and SE is about 0.25" to the upper portion of the edge in both cases and about 1" (for the 6 Plus) or 0.6" (for the SE) from the side portion of the edge. In embodiments where the clip 32 is intended to stand upright on the iPhone 6 Plus or the SE, the relevant distance between the light-emitting element 20b and the edge is therefore 0.25". The distance of the light emitting element to the edge for the Samsung Galaxy™ S7 Edge is about 0.85" from the upper portion of the edge and about 0.85" over from the left side portion of the edge. In embodiments where the clip 32 is intended to stand upright on the Samsung Galaxy™ S7 Edge, the relevant distance between the light-emitting element 20b and the edge is therefore 0.85". The distance of the light-emitting element 20b to the edge for the Blackberry™ Keyone is about 0.34" down from the upper portion of the edge and about 0.45" over from the right side portion of the edge. In embodiments where the clip 32 is intended to stand upright on the Blackberry™ Keyone, the relevant distance between the light-emitting element 20b and the edge is therefore 0.34". The edge is shown at 97 in the figures.

As can be seen in FIG. 3, and as would be understood by one skilled in the art, the surface shown at 99 on the clip 32 is what limits the reach of the light inlet 312 on the rear face 18 of the electronic device 12. The surface 99 may be referred to as a clip limit surface 99. The clip limit surface 99 may therefore be said to be engageable with the edge of the electronic device 12 to determine a reach of the light inlet 312 on the rear face 18 of the electronic device 12. The reach of the light inlet 312 is shown at R in FIG. 3 and is the distance of the surface 99 to the center of the light inlet 312.

It will further be understood by one skilled in the art that, as also can be seen in FIG. 3, when the clip 32 is positioned such that the projector 22 can perform its selected function (i.e. of projecting the image on the receiving surface 28), the reach R of the clip 32 is such that the clip limit surface 99 is spaced from the edge of the electronic device 12 for at least one type of electronic device, which permits the same clip 32 to be usable to mount the projector 22 to different types of electronic device 12 that have different distances of the light-emitting element 20b to the edge of the electronic device 12. Worded another way, the clip limit surface 99 is positioned such that, for a first type of smartphone 12 in which the electronic device feature 20b is positioned at a first distance from the edge 97, the clip is mountable to the first type of smartphone 12 with the external device feature 312 aligned with the electronic device feature 20b on the rear face 18 such that the clip limit surface 99 is spaced from the edge 97 (which is true, for example, in FIG. 3). For a second type of smartphone 12 in which the electronic device feature 20b is positioned at a second distance from the edge 97 that is different than the first distance (inferable from FIGS. 6A, 6B and 6C, the clip 32 is mountable to the second type of smartphone 12 with the external device feature 312 aligned with the electronic device feature 20b on the rear face 18 of the second type of smartphone 12.

The arm marker 36 (shown more clearly in FIGS. 3 and 8) on the first arm 34 may have a similar shape to the screen marker 44 shown in FIG. 6A (e.g. a circle with a cross hair therein) such that alignment of the arm marker 36 with the position and orientation of the screen marker 44 means superposition of the arm marker 36 on the screen marker 44. For this purpose, the arm marker 36 may be provided in a transparent portion 53 of the first clip arm 34. In other embodiments, however, the screen marker 44 may be some other shape and the arm marker 36 need not be provided in a transparent portion of the first clip arm 36 in order to be aligned with the position and orientation of the screen marker 44. For example, the arm marker 36 may include three arrowheads 54 as shown in FIG. 7, which are positioned at three points along the edge of first clip arm 34, and the screen marker 44 may include three other arrowheads 56 that would just abut the three arrowheads 54 on the arm marker 36 when the arm marker 36 is aligned with the position and orientation of the screen marker 44. In such an embodiment, the first clip arm 34 need not include a transparent portion.

Reference is made to FIGS. 9, 10A, 10B and 10C. The mounting of the external device 22 to the second arm 38 is now described in more detail. It is optional that a releasable connection shown generally at 58 (FIGS. 10A and 10B) be provided between the clip 32 and the external device 22. This permits the user to change out the clip 32 for a different one that has preferred features. For example, a slide disk 30 may come in a package with a new clip that has a certain ornamentation theme on it that matches the story illustrates in the slides 24 on the disk 30. The user may switch out the standard clip 32 that came with their device 22 for the new clip to provide increased enjoyment during viewing of the slides 24 on the disk 30. In other embodiments, another clip may be provided for other reasons. For example, while the clip 32 may work generally with a range of different electronic devices, the user may purchase a certain clip that is specifically tailored to fit the specific smartphone 12 that the user owns with reduced obstruction of the display screen 16.

The releasable connection 58 may include a toothed locking arm 60 integrated into one of the second clip arm 38 and the external device 22 and a shoulder 62 on the other of the second clip arm 38 and the external device 22. The toothed locking arm 60 is resiliently flexible and includes a locking tooth 64 thereon. The toothed locking arm 60 flexes (FIG. 10A) when slid past the shoulder 62 in a first direction (e.g. downwards in the view shown in FIG. 10A) and is urged by its resiliency to a locking position (FIG. 10B) wherein the locking tooth 64 overlaps the shoulder 62 to lock the external device 22 to the second clip arm 38.

In the embodiment shown, the toothed locking arm 60 is provided on the second clip arm 38 and the shoulder 62 is provided on the external device 22. More specifically, the shoulder 62 is provided on a first housing portion 66*a* of the external device 22. The housing of the external device 22 may further include a second housing portion 66*b* and a third housing portion 66*c*. A slot 67 (FIG. 9) may be provided in the housing (e.g. between housing portions 66*a* and 66*b*), so that the shoulder 62 and the toothed locking arm 60 are hidden when the external device 22 is mounted to the second clip arm 38.

The locking tooth 64 shown is provided with a chamfered leading edge 65 in order to facilitate the passing of the locking tooth 64 past the projection on the housing portion 66*a* that has the shoulder 62 on it. Additionally or alternatively, the projection that has the shoulder 62 on it may be provided with a chamfered edge.

Figure 10A:
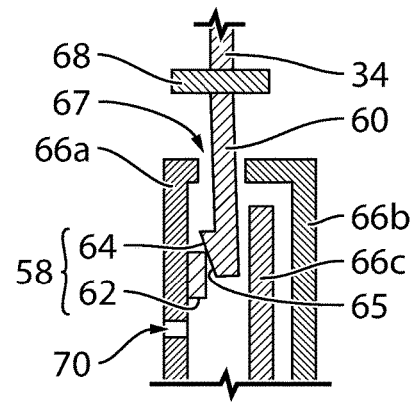
FIGS. 10A, 10B and 10C are sectional views of the device-and-clip assembly during connection of an external device from the device-and-clip assembly to a cip arm from the device-and-clip assembly.
Figure 10B:
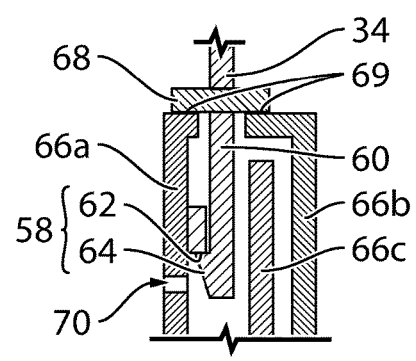
Figure 10C:
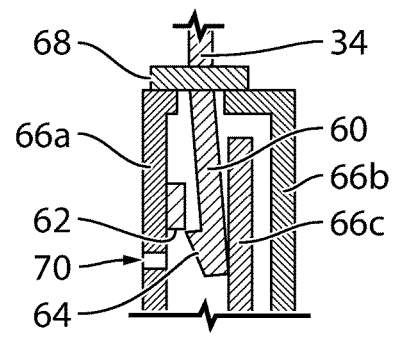

When the toothed locking arm 60 is in the locking position shown in FIG. 10B, a flange 68 on the toothed locking arm 60 may engage an engagement surface 69 of the housing of the external device 22 to cooperate with the engagement of the locking tooth 64 and the shoulder 62 to help retain the external device 22 on the second clip arm 38.

The toothed locking arm 60 is movable away from the locking position (FIG. 10C) so as to be slid past the shoulder in a second direction (e.g. upwards in the view shown in FIG. 10A) for separation of the second clip arm 38 from the external device 22. In the embodiment shown, a release aperture 70 is provided in the housing portion 66*a* that permits a user to insert a paperclip end or the like to push the toothed locking arm 60 away from the locking position.

In some embodiments it is possible that the application 42 is executable by the electronic device 12 so as to instruct the electronic device 12 to display a screen marker on the display screen 16 in a selected position such that positioning of the first clip arm 34 on the display screen 16 with the arm marker 36 aligned with the position of the screen marker positions the external device 22 in alignment with the at least one electronic device feature. In other words, in some embodiments, it is not necessary for the screen marker 44 to have a distinguishable orientation in order to ensure that the external device 22 is suitably aligned with the at least one electronic device feature 20. In such embodiments, the at least one electronic device feature is a single feature and the screen marker and the single feature 20 are aligned with one another. Additionally, the arm marker 36 on the first clip arm 34 and the element of the external device 22 that would be aligned with the electronic device feature 20 would be aligned. As a result, when the device-and-clip assembly 21 is placed with the arm marker 36 aligned with the screen marker, the element on the external device 22 is automatically already in alignment with the electronic device feature 20. Thus it may be said that an application for the electronic device 12 may be provided that is executable by the electronic device so as to instruct the electronic device 12 to display a screen marker 44 on the display screen in a selected position such that positioning of the first clip arm 34 on the display screen 16 with the arm marker 36 aligned with the position of the screen marker 44 positions the external device 22 in alignment with the at least one electronic device feature (e.g. the light-emitting element 20*b*) to perform a selected function (which in this case is to transmit light through the projector 22 to project the image on the slide transparency 24 on the receiving surface 28).

Figure 11A:
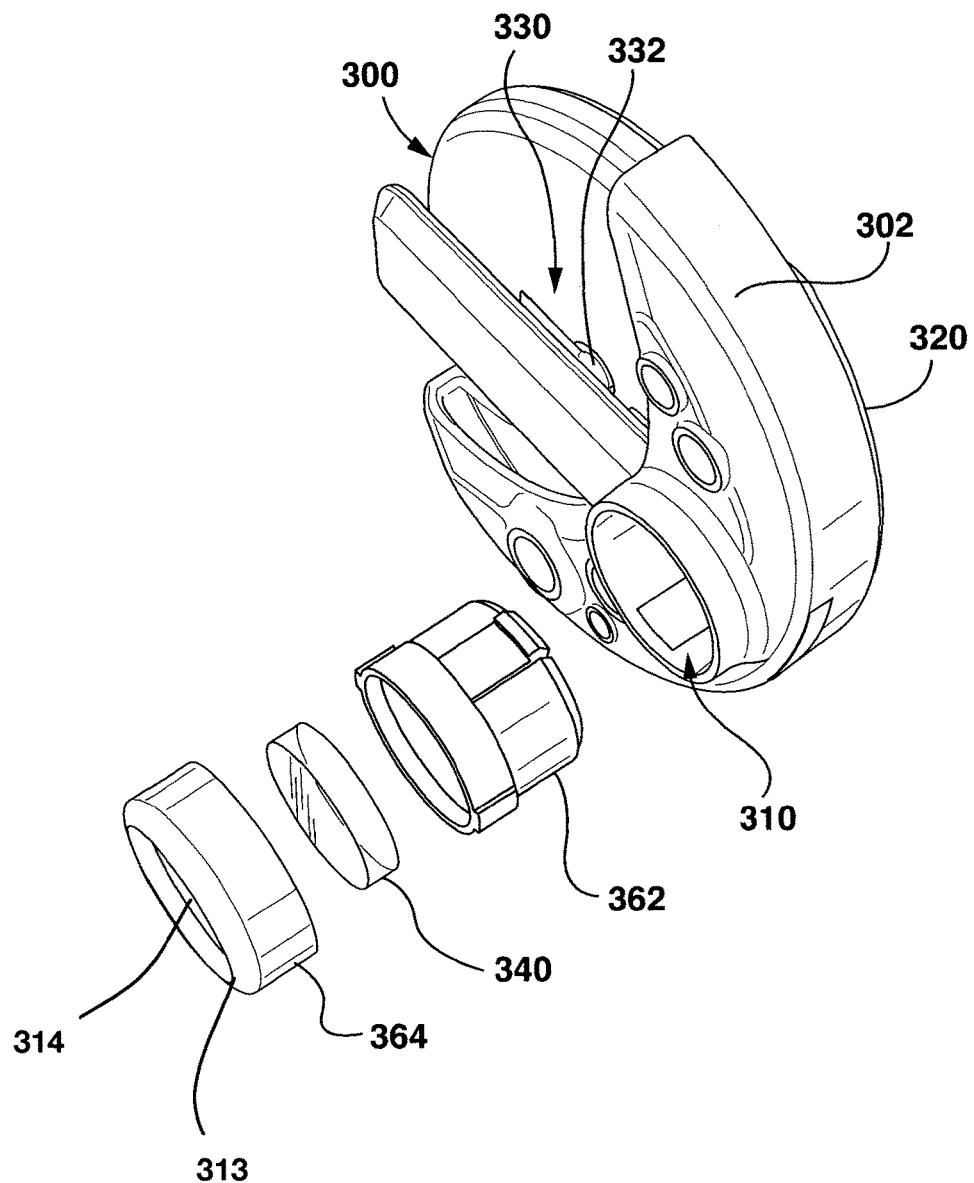
FIG. 11A is front perspective exploded view of an embodiment of projector.
Figure 11B:
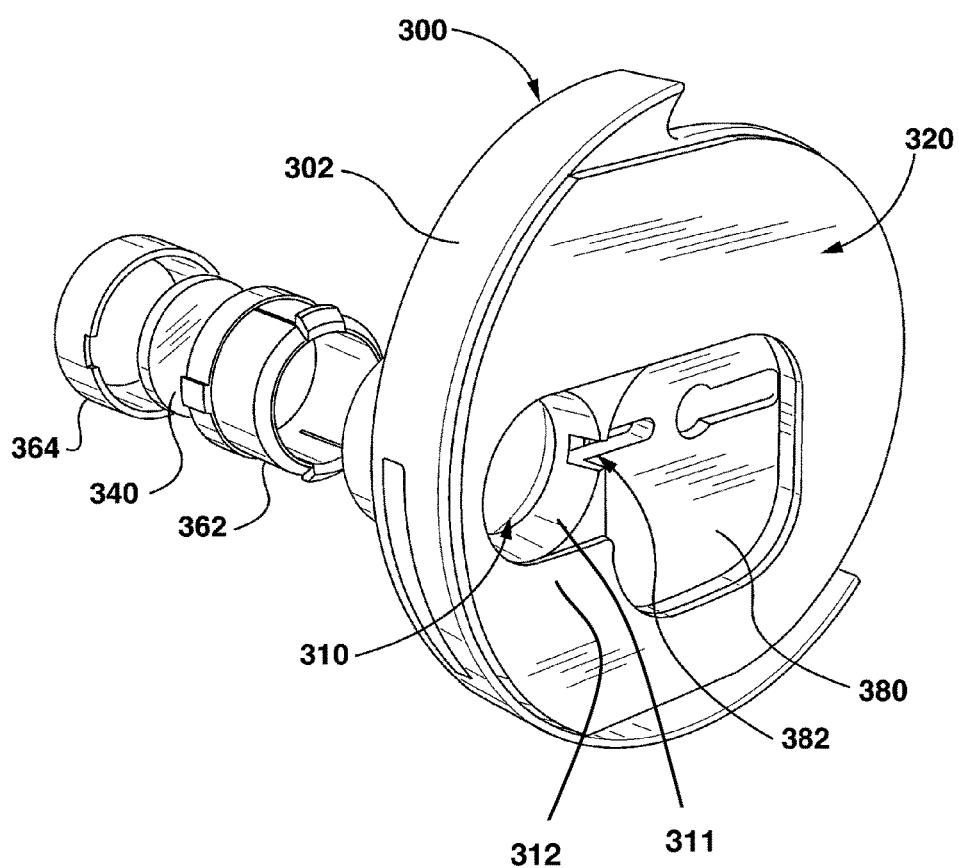
FIG. 11B is a rear perspective exploded view of the image projection device of FIG. 11A.

An example of the projector is shown at 300 in front and rear exploded perspective views in FIGS. 11A and 11B. The projector 300 has a light passage 310 (which may also be referred to as an aperture 310) therethrough. The projector 300 has an inside face 311 that defines a light inlet 312 to the light passage 310, and an outside face 313 defining a light outlet 314 from the light passage 310.

The projector 300 includes a slide frame receiving slot 330 positioned to hold a slide transparency 402 in the light passage 310 for transmission of light therethrough. The slide transparency 402 may be provided on a slide frame 400 that holds one or more slide transparencies 402 (i.e. the side frame 400 holds at least one slide transparency 402). The slide frame 400 may be similar to the slide disk 30 in FIG. 2, however the slide frame 400 includes rectangular slide transparencies 402, whereas the slide disk 30 includes circular transparent slides 24. The term slide transparency and transparent slide may be used interchangeably. The term 'slide frame' is intended to be broader than 'slide disk' and is intended to encompass elements that hold one or more slides and which have shapes that are other than circular.

The slide frame receiving slot 330 contains a slide frame alignment mechanism 332 for engaging with the center of slide frame 400. The center of slide frame 400 can have a hole, depression, protrusion, axle or any other suitable structure that mates with the slide frame alignment mechanism 332 to position the slide frame 400 in position and allow for rotation thereof. FIG. 11A illustrates a flexible protrusion 332 that can engage a hole or depression at the center of the slide frame 400.

FIGS. 11A and 11B illustrate an embodiment having a focus adjustment mechanism that allows movement of the magnifying lens 340. The focus adjustment mechanism includes a lens slide 362 that can move forwards and backwards (i.e. axially) within the aperture 310. The focus adjustment mechanism includes a lens attachment 364 that clips onto the lens slide 362 to hold the magnifying lens 340 in a press-fit between the lens attachment 364 and the lens slide 362. The focus adjustment mechanism may be any suitable structure for permitting a user to move the magnifying lens 340 so as to adjust its distance from the slide 402.

The projector 300 is, as noted above, an example of an external device 22 that may be used with the clip 32 (FIGS. 1-10C). When the clip 32 is in the closed position, the projector is holdable by the clip 32 such that the light inlet 312 faces the light-emitting element 20*b* so as to receive light therefrom into the light passage 310, so as to transmit the light through the slide transparency 402, and project an image on the slide transparency 402 out through the light outlet 314 onto a suitable receiving surface.

Another variant of the projector is shown at 700 in FIGS. 12A and 12B. FIG. 12 shows a projector 700 that is separate from and attached to an example of the mobile device 12A. FIG. 12B is a cross-sectional view of the image projection device 700 along line A-A in FIG. 12A. The image projection device 700 has a body 702 that has an aperture 710 therethrough, which may also be referred to as a light passage, which is alignable with camera flash 20b. A slide transparency 802 is alignable with aperture 210 and is illuminated by camera flash 20b. Magnifying lens 740 enlarges illuminated slide transparency 402 onto a projection surface, such as a wall, ceiling, or projection screen.

The projector 700 has a body 702 and an attachment mechanism 720, which could optionally be a mechanical clamp such as the clip 32. The body 702 has an inside face 726 that defines a light inlet 727 to a light passage 710 (also referred to as an aperture 710), and an outside face 728 that defines a light outlet 729 from the light passage 210. The body 702 further provides a slide frame receiving slot 730 (which may, more broadly, be referred to simply as a slot 730) that is shaped to receive a slide frame 800 that contains any number of slide transparencies 802 (i.e. at least one slide transparency 802). The slot 730 is positioned to hold a slide transparency 802 in the light passage 710 for transmission of light therethrough.

The slide frame 800 can be round, rectangular or any other shape, and the slide frame receiving slot 730 will have a corresponding shape to accommodate the slide frame 4800. The slide frame receiving slot 730 may be transverse to the aperture 710 in order to position slide frame transparencies within the aperture 710. The camera flash 20b, under control of the mobile device 12, illuminates the slide transparency 802 within the aperture 710. The slide frame receiving slot 730 can be formed within the body 702, as shown in FIG. 12B, or in a channel on the rear-facing surface of body 702 (i.e. the outside face 728). The position of the slide frame receiving slot 730 with respect to the body 702, the camera flash 20b, and the magnifying lens 740 can be selected to optimize image projection quality.

The magnifying lens 740 is aligned with the aperture 710 and positioned at the front of the body 702 of the image projection device 700. The magnifying lens 740 is positioned between the illuminated a slide transparency and the projection surface. The magnifying lens 740 enlarges the slide transparency 802 that is illuminated by camera flash 20b for projection onto a projection surface, such a wall or ceiling, for example. Although a simple biconvex lens is shown for illustration purposes, a person skilled in the art would provide the appropriate lens design to provide magnification and projection of a slide transparency. This can include compound lens designs involving more than one lens.

Some embodiments of the image projection device 700 can further include a focus adjustment mechanism 760 that houses the magnifying lens 740. The focus adjustment mechanism 760 can allow translation of the magnifying lens 740 axially with respect to the aperture 710 to change the distance between an illuminated slide transparency 802 and magnifying lens 740 in order to alter the magnification or focus of the projected image. The focus adjustment mechanism 760 can include a telescoping arrangement or a screw-type arrangement that allows for movement of the magnifying lens 740. In a compound lens design that utilizes two or more lenses, only one of the lens may be moveable by the focus adjustment mechanism 760.

Preferred embodiments of the image projection device 700 can also include a flash conditioner 750 that is aligned with, or positioned within, the aperture 710 between camera flash 20b and a slide transparency 702. The flash conditioner 750 is positioned on an opposite side of the slide frame receiving slot 730 from magnifying lens 740 such that the optical path from the camera flash 20b passes through the flash conditioner 750, followed by a slide transparency, and finally magnified by magnifying lens 740. The flash conditioner 750 can assist with providing proper and full illumination of the slide transparency 802. The flash conditioner 750 can include, for example, a light diffusing material or an optical condenser, such as a collimation lens (e.g. a plano-convex lens), or a combination thereof. For example, a plano-convex lens can be used so that incoming LED light beams from camera flash 20b are formed into parallel light beams as they hit the slide transparency so the projected image can have improved clarity. In embodiments used to project photographic-quality slides, a flash conditioner may be used to obtain reasonable clarity of the projected image.

The aperture 710 can have a variety of shapes. The aperture 710 can be round to accommodate a round magnifying lens 740, for example. Aperture 710 can also be shaped similar to the shape of the slide transparencies on the slide frame, which can be round, rectangular, or any other shape, so that slide transparency 802 completely fills aperture 710. Aperture 710 can also be conically shaped, or similarly have an increasing size, from the rear surface of body 702 adjacent to camera flash 20b to the front surface of body 702.

Figure 4:
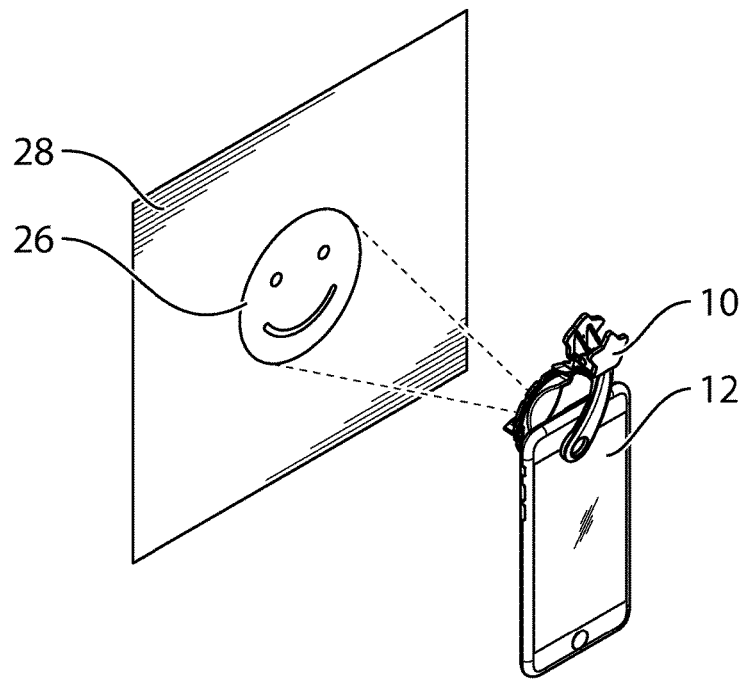
FIG. 4 is a perspective view of the device-and-clip assembly being used to project an image on a receiving surface.

When the clip 32 is in the closed position, the projector 700 is holdable by the clip 32 such that the light inlet 727 faces the light-emitting element 20b so as to receive light therefrom into the light passage 710, so as to transmit said light through the slide transparency 802, and project an image on the slide transparency 802 out through the light outlet 729 onto a suitable receiving surface such as surface 28 in FIG. 4.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device-and-clip system for an electronic device having a front face with a display screen thereon, a rear face opposite to the front face, and an edge between the front and rear faces, the device-and-clip system comprising:
   an external device that is separate from the electronic device and which has an external device feature, wherein the external device is cooperable with the electronic device when the external device feature is aligned with an electronic device feature on the rear face to perform a selected function;
   a clip including
   a first clip arm having an arm marker thereon and which is engageable with the front face;
   a second clip arm that is engageable with the rear face, wherein the first and second clip arms are connected to one another and are movable between an open position to permit removal of the clip from the electronic device and a closed position in which the first and second clip arms clamp the electronic device, wherein the external device is mounted to the clip; and wherein the clip has a clip limit surface that is engageable with the edge of the electronic device to determine a reach of the external device feature on the rear face of the electronic device,
wherein the clip limit surface is positioned such that, for a first type of electronic device in which the electronic device feature is positioned at a first distance from the edge, the clip is mountable to the first type of electronic device with the external device feature aligned with the electronic device feature on the rear face such that the clip limit surface is spaced from the edge,
and for a second type of electronic device in which the electronic device feature is positioned at a second distance from the edge that is different than the first distance, the clip is mountable to the second type of electronic device with the external device feature aligned with the electronic device feature on the rear face of the second type of electronic device.

2. A device-and-clip system as claimed in claim 1, further comprising an application that is executable by the electronic device so as to instruct the electronic device to display a screen marker on the display screen in a selected position such that positioning of the first clip arm on the display screen with the arm marker aligned with the position of the screen marker positions the external device in alignment with the at least one electronic device feature.

3. A device-and-clip system as claimed in claim 1, wherein the at least one electronic device feature includes a light-emitting element.

4. A device-and-clip system as claimed in claim 3, wherein the external device is a projector that is positionable to receive light from the light-emitting element, to pass the light through a transparent slide containing an image, and to project the image onto a suitable receiving surface.

5. A device-and-clip system as claimed in claim 1, wherein the first clip arm includes a transparent portion and the arm marker is positioned in the transparent portion.

6. The image projection device of claim 1, wherein the projector further includes a flash conditioner aligned with the aperture and opposite the magnifying lens with respect to the slot.

7. The image projection device of claim 1 further comprising a focus adjustment mechanism containing the magnifying lens, the focus adjustment mechanism for translating the magnifying lens axially with respect to the aperture.

8. The image projection device of claim 7, wherein the focus adjustment mechanism is any one of a telescoping mechanism and a screw-type mechanism.

9. A device-and-clip system for an electronic device having a front face with a display screen thereon, and a rear face opposite to the front face, the device-and-clip system comprising:
an external device that is separate from the electronic device but which cooperates with at least one electronic device feature on the rear face to perform a selected function;
a clip including
a first clip arm having an arm marker thereon and which is engageable with the front face;
a second clip arm that is engageable with the rear face, wherein the first and second clip arms are connected to one another and are movable between an open position to permit removal of the clip from the electronic device and a closed position in which the first and second clip arms clamp the electronic device, wherein the external device is mounted to the clip; and
an application that is executable by the electronic device so as to instruct the electronic device to display a screen marker on the display screen in a selected position such that positioning of the first clip arm on the display screen with the arm marker aligned with the position of the screen marker positions the external device in alignment with the at least one electronic device feature.

10. A device-and-clip system as claimed in claim 1, wherein the at least one electronic device feature includes a light-emitting element.

11. A device-and-clip system for an electronic device having a front face with a display screen thereon, and a rear face opposite to the front face, the device-and-clip system comprising:
a projector that is separate from the electronic device, wherein the projector has an aperture therethrough, an inside face defining a light inlet to the aperture, and an outside face defining a light outlet from the aperture, wherein the projector further includes a slot positioned to hold a slide transparency in the aperture for transmission of light therethrough, wherein the projector further includes a magnifying lens aligned with the aperture and positioned to enlarge an image on the slide transparency for projection through the light outlet; and
a clip including
a first clip arm that is engageable with the front face; and
a second clip arm that is engageable with the rear face, wherein the first and second clip arms are connected to one another and are movable between an open position to permit removal of the clip from the electronic device and a closed position in which the first and second clip arms clamp the electronic device,
wherein, in the closed position, the projector is holdable by the clip such that the light inlet faces the light-emitting element so as to receive light therefrom into the light passage, so as to transmit said light through the slide transparency, and project an image on the slide transparency out through the light outlet onto a suitable receiving surface.

12. The image projection device of claim 1, wherein the projector further includes a flash conditioner aligned with the aperture and opposite the magnifying lens with respect to the slot.

13. The image projection device of claim 1 further comprising a focus adjustment mechanism containing the magnifying lens, the focus adjustment mechanism for translating the magnifying lens axially with respect to the aperture.

14. The image projection device of claim 13, wherein the focus adjustment mechanism is any one of a telescoping mechanism and a screw-type mechanism.

* * * * *